United States Patent [19]
Stephen

[11] Patent Number: 4,571,025
[45] Date of Patent: Feb. 18, 1986

[54] REFLECTIVE SYSTEM FOR BICYCLES

[76] Inventor: Robert V. Stephen, 4012 N. 127th Ct., Box 342, Omaha, Nebr. 68164

[21] Appl. No.: 630,633

[22] Filed: Jul. 13, 1984

[51] Int. Cl.⁴ .............................................. G02B 5/12
[52] U.S. Cl. ...................................... 350/99; 350/97; 301/375 A
[58] Field of Search ................... 350/97, 99, 102, 104; 301/375 A

[56] References Cited

U.S. PATENT DOCUMENTS

| | | | |
|---|---|---|---|
| 1,892,860 | 1/1933 | Wehr et al. | 350/97 |
| 2,561,173 | 7/1951 | Bompart | 350/97 |
| 2,690,094 | 9/1954 | Becker | 350/99 |
| 3,458,245 | 7/1969 | Stanley | 350/102 |
| 3,894,790 | 7/1975 | Golden et al. | 350/99 |
| 3,905,680 | 10/1975 | Nagel | 350/97 |
| 3,907,404 | 9/1975 | McEwin | 350/99 |
| 3,963,307 | 6/1976 | Kirk | 350/99 |
| 4,093,263 | 6/1978 | Rihm | 350/97 |
| 4,113,351 | 9/1978 | Kitrell | 350/99 |
| 4,117,962 | 10/1978 | Pletscher | 350/97 |
| 4,178,070 | 12/1979 | Thibodeau, Sr. | 350/99 |
| 4,252,409 | 2/1981 | Schwab | 350/97 |

FOREIGN PATENT DOCUMENTS

| | | | |
|---|---|---|---|
| 572042 | 12/1931 | Fed. Rep. of Germany | 350/97 |
| 759130 | 1/1934 | France | 350/97 |

*Primary Examiner*—John K. Corbin
*Assistant Examiner*—William Propp

[57] ABSTRACT

A reflective system for bicycles includes a pair of bent triangle shaped reflectors which are mounted in oppositely facing fore and aft directions on a bicycle so as to present at least one large bright triangular shaped reflective surface to any position around the bicycle. The front and rear reflectors are preferably of different colors so as to provide a ready indication of both the presence and direction of travel of a bicycle.

16 Claims, 6 Drawing Figures

REFLECTIVE SYSTEM FOR BICYCLES

BACKGROUND OF THE INVENTION

The present invention is directed generally to an improved bicycle reflector and more particularly to a durable and highly visible reflector set for a bicycle which enables both the presence and direction of movement of a bicycle to be readily detectable by motorists at substantial distances.

Reflectors have been in common usage on bicycles for years. Most modern bicycles are equipped with a forwardly facing white planar reflector, a rearwardly facing red planar reflector and possibly reflectors on the edges of the pedals which are visible from the rear and spoke reflectors which are visible from the side. Conventional reflectors are generally of such small size and planar shape that a fast-moving motorist is alerted to the presence of the bicycle too late to safely stop short of the bicycle when no diversion path is available. Likewise, conventional reflectors afford only a confusing indication, at best, of the direction of movement of a bicycle to a motorist approaching from the side.

Accordingly, a primary object of the invention is to provide an improved reflective system for bicycles.

Another object is to provide for the safe operation of a bicycle at dawn, dusk and after sundown.

Another object is to provide a bicycle reflector of a large bent triangle configuration and arranged on the bicycle so as to expose a triangle shaped surface to a motorist approaching the bicycle from a direction either parallel or normal to the direction of bicycle movement.

Another object is to provide a reflective system for bicycles wherein a pair of oppositely disposed bent triangle reflectors are provided on the front and rearward ends of a bicycle so that at least one of the reflectors is readily visible from any direction.

Another object is to provide a reflective system for bicycles wherein the reflective surfaces are color coded to afford a ready indication of the direction of movement of the bicycle.

Finally, another object is to provide a reflective system for bicycles which is simple and rugged in construction, durable in use and efficient in operation.

SUMMARY OF THE INVENTION

The reflective system for a bicycle, according to the present invention, includes a pair of bent triangle shaped reflectors which are mounted in oppositely facing directions on fore and aft portions of a bicycle so as to present at least one large bright triangular shaped reflective surface to any position around the bicycle. Each reflector includes an upright generally triangular plate which is bent about an upright axis generally transversely aligned with the apex at the top of the triangle. The front surface of each reflector is covered with a bright highly reflective material and a mounting device is provided for securing each reflector in upright relation on a bicycle. The reflectors are preferably made of a soft pliable plastic for durability.

The reflectors are color-coded, preferably yellow in the front and red in the back so as to provide a ready indication of both the presence and direction of travel of a bicycle to an oncoming motorist. The mounting mechanism may be integrally formed with the folded triangle member and is compatible with the mounts for conventional bicycle reflectors so as not to require any special brackets.

DESCRIPTION OF THE PREFERRED EMBODIMENT

Figure 1:
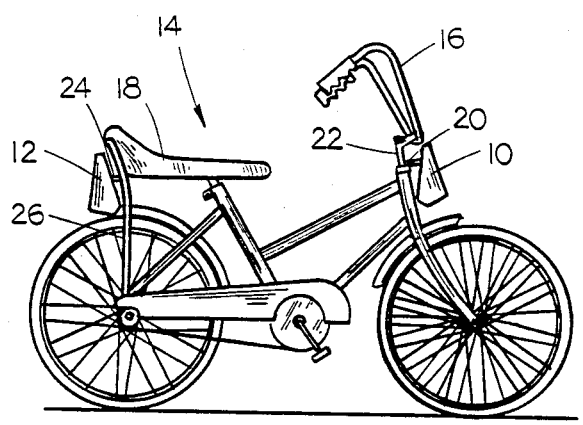
FIG. 1 is a side elevational view of a bicycle equipped with the reflective system of the invention.

The reflective system of the present invention is shown in FIG. 1 as including front and rear reflectors 10 and 12 mounted on a bicycle 14. Whereas FIG. 1 illustrates a child's bicycle including high rise handle bars 16 and a banana seat 18, it is to be understood that the reflectors 10 and 12 of the invention are adapted for use on any bicycle or other such vehicle.

Front reflector 10 is mounted on the conventional reflector bracket 20 which extends forwardly from the base of the handle bar stem 22. Likewise, the rear reflector 12 is secured to the conventional rear reflector bracket 24 on seat posts 26 in place of the conventional reflector.

In FIGS. 2-5, it is seen that the front and rear reflectors 10 and 12 are preferably of identical construction, although being of different colors as described below. Accordingly, like reference numerals are used to designate like parts of each reflector.

Front reflector 10 includes a first upright generally triangular plate 28 having front and back surfaces 30 and 32, a blunted apex 34 at the top and center thereof, a pair of side edges 36 and 38 extended downwardly and outwardly therefrom to the opposite ends of a bottom edge 40. The lower corners at the junctions of side edges 36 and 38 with bottom edge 40 may also be blunted as indicated at 42 and 44 to eliminate any sharp edges which could cause injury if the operator spills the bicycle over on its side.

The first triangular plate 28 is bent about an upright axis 46 which is generally transversely aligned with the apex 34 of the first plate to provide a folded triangle member as shown.

Figure 6:
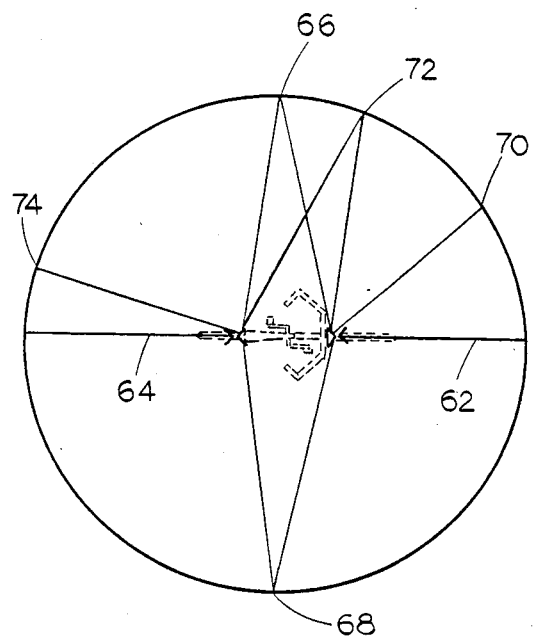
FIG. 6 is a diagrammatic top end view of a pair of reflectors installed on a bicycle showing the visibility from any position around the bicycle.

A 90° fold angle between the substantially flat side portions 48 and 50 is preferred for optimum visibility from all directions. It is contemplated that any included angle between 45° and 135° would be operative. An increase in the fold angle facilitates visibility from the front and rear of the bicycle whereas a decrease in the fold angle reduces visibility from the front and rear but increases visibility from the side. This assumes that each reflector is mounted in symmetrical relation with respect to the longitudinal upright center plane of the bicycle, as indicated in FIG. 6.

The front surface of the folded triangle member 28 is substantially covered by a sheet 52 of a bright highly reflective material. Such sheets are commercially available with an adhesive backing for ready application to the front surface 30. A preferred sheet has a 175% elongation factor to assure maximum flexibility. The reflective sheet 52 is preferably trimmed to conform to the shape of front surface 30 while leaving a small uncovered border along the edges 36, 38 and 40.

Figure 2:
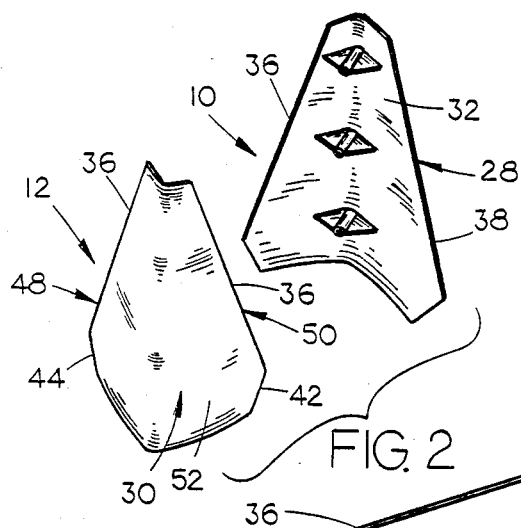
FIG. 2 is a perspective view of a pair of reflectors of the invention.
Figure 4:
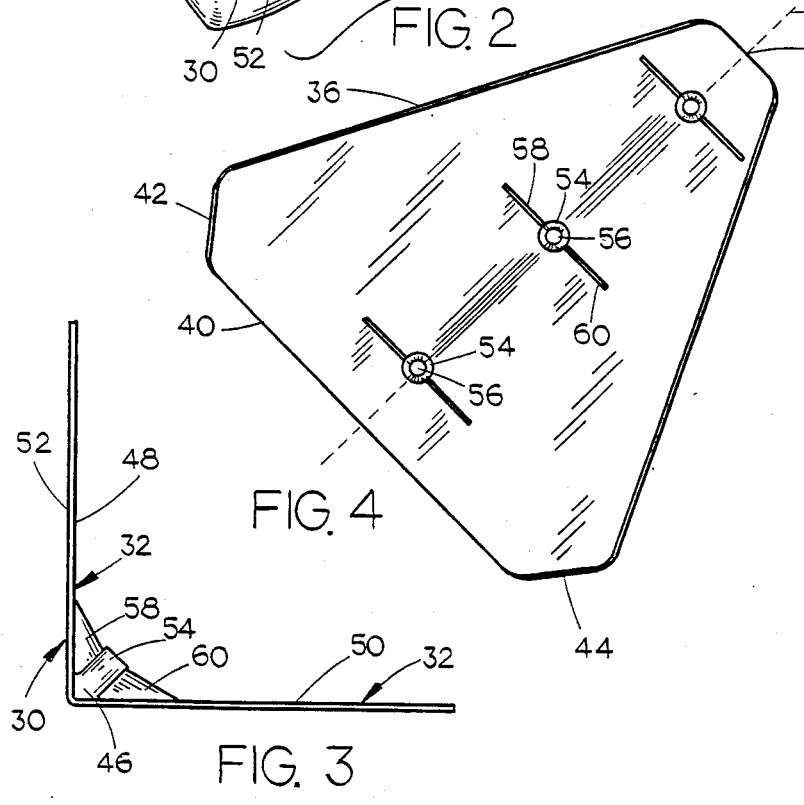
FIG. 4 is a rear elevational view of a reflector.
Figure 3:
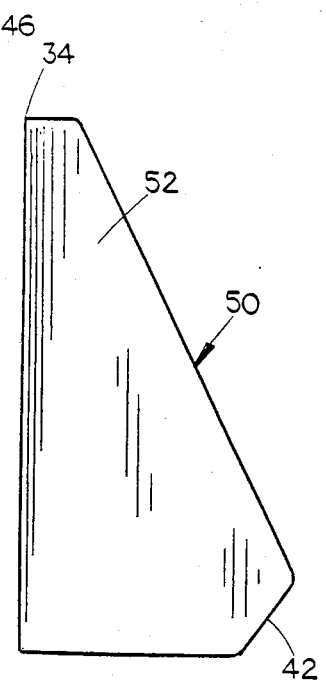
FIG. 3 is a top view of a reflector.
Figure 5:
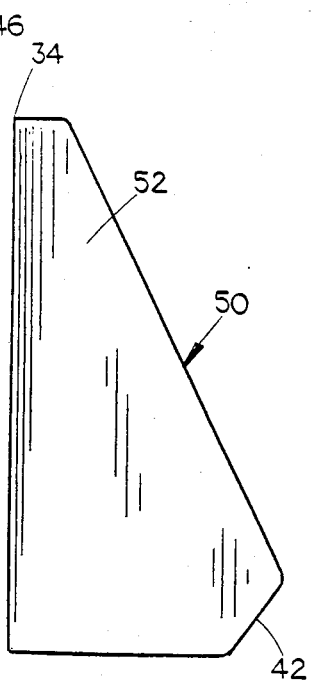
FIG. 5 is a side elevational view of a reflector.

The mounting means for reflector 10 is shown in FIGS. 2, 3 and 4 as including a plurality of vertically spaced-apart rearward protrusions 54 centered on the folded triangle member 28 along axis 46. Each protrusion includes a rearwardly open screw hole 56 which is adapted to threadably receive the attachment screw for a conventional bicycle reflector. Gussets 58 and 60 are formed between protrusion 54 and side members 48 and 50 respectively to afford added reinforcement for both the protrusions and side members.

The reflectors 10 and 12 are preferably formed of a soft pliable plastic which will not break or injure the user. Suitable materials include urethane, thermoplastic rubbers and manufactured thermoplastic resins.

The reflective front surfaces of reflectors 10 and 12 are preferably of different colors and preferably yellow for front reflector 10 and red for rear reflector 12. These are the colors which are standard on automobile directional signals as designating the front and rear ends of the vehicle. Accordingly, if a motorist's headlights are reflected on a single yellow triangle, the motorist recognizes that the bicycle is coming toward him. Likewise, a single red triangle indicates a bicycle proceeding in the same direction as the motorist. A pair of red and yellow triangles designates a bicycle traveling across the path of the motorist in a direction of the yellow reflector. For example, if the yellow reflector is to the right of the red reflector, the motorist is advised that the bicycle is proceeding to the right.

The reflective system of the present invention greatly enhances the safety of riding bicycles in low light conditions. Since it takes an average vehicle approximately 243 feet to come to a stop from 55 mph velocity, it is important that any reflector be visible far in excess of that distance. Reflectors of the present invention having a height of approximately 7 inches and a depth of approximately 5 inches for each side member 48 and 50 have demonstrated reflectability of distances of up to 800 feet. A motorist is thus made aware of both the presence and direction of travel of a bicycle well in advance so that any necessary stopping, slowing or steering adjustments may be readily completed to ensure the cyclist's safety prior to the motor vehicle reaching him.

In FIG. 6, the visibility of the reflective system of the invention from any position around the bicycle is illustrated. Arrows 62 and 64 are directed from positions directly in front of and behind the bicycle respectively. From each of these directions, a large single triangle is presented. The fact that the triangle shape is recognized world-wide as a "warning" symbol constributes to the effectiveness of the invention. At positions 66 and 68 directly to the sides of the bicycle, the viewer is presented with two triangles of different colors. Finally, at any of the intermediate positions, as indicated at 70, 72 and 74, the viewer is presented with at least one large triangular reflective surface to afford an effective early warning of the presence of the bicycle.

Thus there has been shown and described a reflective system for bicycles which accomplishes at least all of the stated objects.

I claim:

1. A reflective system for a bicycle, comprising
   a first upright generally triangular plate having front and back surfaces and generally defining an apex at the top and having a pair of side edges extended downwardly and outwardly therefrom to opposite ends of a bottom edge thereof,
   said first plate being bent about an upright axis generally transversely aligned with the apex of said triangular first plate to provide a first folded triangle member,
   the front surface of said first folded triangle member being covered with a bright highly reflective material, and
   mounting means associated with said first folded triangle member for securing it in upright stationary relation to a bicycle.

2. The reflective system of claim 1 wherein said first folded triangle member is made of a soft pliable plate material.

3. The reflective system of claim 1 further comprising
   a second upright generally triangular plate having front and back surfaces and generally defining an apex at the top and having a pair of side edges extended downwardly and outwardly therefrom to opposite ends of a bottom edge thereof,
   said second plate being bent about an upright axis generally transversely aligned with the apex of said triangular first plate to provide a second folded triangle member,
   the front surface of said second folded triangle member being covered with a bright highly reflective material, and
   mounting means associated with said second folded triangle member for securing it in upright stationary relation to a bicycle.

4. The system of claim 3 wherein the front surfaces of said first and second plates are of different colors.

5. The system of claim 4 wherein the front surface of said first plate is of a yellow reflective color and the front surface of said second plate is of a red reflective color.

6. The system of claim 1 wherein said mounting means is integrally formed with said first plate.

7. The system of claim 1 wherein said mounting means comprises at least one rearward protrusion on the back surface of said first plate.

8. The system of claim 7 wherein said protrusion includes a rearwardly opening screw hole in said protrusion, said hole being adapted to threadably receive the attachment screw for a conventional bicycle reflector.

9. The system of claim 1 wherein the apex and lower corners of said first plate are of a blunted shape.

10. The system of claim 1 wherein the height of said folded triangle member is between 5 and 9 inches.

11. The system of claim 1 wherein the bend in said first plate is approximately 90°.

12. In combination with a bicycle, a first reflector comprising
    a first upright plate having front and back surfaces,
    said first plate being bent about an upright central axis to provide a first folded member,
    the front surface to said first folded member being covered with a bright highly reflective material, and
    mounting means associated with said first folded member for securing it in upright relation to a bicycle,
    said first plate comprising a single integral member having a pair of generally flat triangular shaped side portions joined together at the bend about said upright central axis.

13. The combination of claim 12 further comprising a second reflector comprising a second upright plate having front and back surfaces,
said second plate being bent about an upright central axis to provide a second folded member,
the front surface of said second folded member being covered with a bright highly reflective material, and
mounting means associated with said second folded member for securing it in upright relation to a bicycle,
said second plate comprising a single integral member having a pair of generally flat triangular shaped side portions joined together at the bend about said upright central axis.

14. The combination of claim 13 wherein said first and second reflectors are mounted in longitudinally spaced-apart relation on said bicycle with the front surfaces thereof disposed in oppositely facing fore and aft directions respectively.

15. The combination of claim 14 wherein said first and second reflectors are mounted in symmetrical relation with the longitudinal upright center plane of the bicycle.

16. The combination of claim 15 wherein said first and second reflectors are triangular in shape.

* * * * *